April 30, 1963  C. H. ROSE ETAL  3,087,365
ELECTRO-HYDRAULIC SYSTEM FOR CONVERTING A LATHE
TO AUTOMATIC THREADING OPERATION
Filed Dec. 8, 1960  7 Sheets-Sheet 3

Fig. 3.

INVENTORS
Charles H. Rose
Alf Miller
BY
S. J. Rotondi & A. J. Dupont

United States Patent Office 3,087,365
Patented Apr. 30, 1963

3,087,365
ELECTRO-HYDRAULIC SYSTEM FOR CONVERTING A LATHE TO AUTOMATIC THREADING OPERATION
Charles H. Rose, Selkirk, and Alf Miller, Troy, N.Y., assignors to the United States of America as represented by the Secretary of the Army
Filed Dec. 8, 1960, Ser. No. 74,738
8 Claims. (Cl. 82—5)
(Granted under Title 35, U.S. Code (1952), sec. 266)

This invention described herein may be manufactured and used by or for the Government for governmental purposes without the payment of any royalty thereon.

This invention relates to hydraulic-electrical systems for automatically controlling the operation of metal cutting lathes and more particularly to such systems which adapt metal cutting lathes for forming threads on a workpiece.

One of the problems which has arisen in the manufacture of cannon tubes for modern, high-pressure propellants has to do with the formation of the threads on the breech ends of the tubes.

The conventional means used by ordnance manufacturers for threading cannon tubes have been hob milling or grinding. Grinding is not completely satisfactory because the degree of heat produced in this type of metal working, and the large amount of metal to be removed on cannon tubes, changes the surface metallic structure of the tube to the extent that it sometimes cracks. Hobbing does not produce as much heat, to affect so radically the metallic structure of the tube, but this method takes about three times as long to form the threads and, because of the large size of the cannon tubes, the hobs chatter while cutting to leave on the threads a surface condition which is less than ideal for mating parts.

The most satisfactory method of forming the threads is to cut them by means of a lathe as the threads formed in this manner have a finish which does not require a refinishing operation and the heat produced in the metal removal is not sufficient to adversely affect the metallic structure. In the past, however, there has not been available a suitable means for utilizing the large and expensive lathes already on hand in the shops of the manufacturers of cannon tubes so that the threads thereon may be formed rapidly, automatically and accurately.

It is, therefore, the general object of this invention to provide a hydraulic-electrical system which is especially well adapted for automatically operating a metal cutting lathe so as to form threads on a workpiece rapidly and accurately even by inexperienced operators.

It is a more specific object of this invention to provide such a system with interlocks to achieve a fool-proof operation while the cutting tool is in the lead and making a cut with the tool retracting fully and the carriage returning to the start position if the carriage should accidentally become disconnected from the lead screw or when the operator hits the stop button.

It is another object of this invention to provide such a system wherein the depth of the thread forming cut is controlled by both the electrical system and a cooperating cam-clutch device for advancing the cutting position of the tool so that the advancement of the cutting position of the tool beyond a predetermined limit is prevented both electrically and mechanically, thus assuring accurate thread formation even when an inexperienced operator is employed.

It is a further object of this invention to provide in combination with the hydraulic-electrical system a cam-sprag clutch device which assures positive and controlled tool feed through hydraulically actuated mechanical means.

It is still another object of this invention to provide a hydraulic-electrical system which is sequence operated with one operation accurately triggering the next so that the only limit to the operating speed of the lathe is the quality of the cutting tool.

It is a still further object of this invention to provide such a system wherein complete interlocking prevents any lead error as the cutting tool cannot move into the workpiece until a half-nut device completely engages the carriage with the lead screw.

It is another and still further object of this invention to provide such a system wherein nearly all the elements are mounted on the carriage so that the cutting operation can be easily performed along any part of the lathe bed, with the elements which are not disposed in the carriage being adjustably mounted on the bed.

It is still another and further object of this invention to provide such a system and cooperating cam-clutch device which are simple in design and positive in operation.

It is still another and further object of this invention to provide such a system which provides for the withdrawal of the threading tool from the solid material of the gun tube thus eliminating the necessity of a gain slot or groove to terminate the thread.

The specific nature of the invention as well as other objects and advantages thereof will clearly appear from a description of a preferred embodiment as shown in the accompanying drawings in which.

Shown in the figures is a lathe 12 which includes a bed 14 extending from a power unit 16 having conventional motor and transmission means for rotating a drive head 18. Drive head 18 is adapted to grasp the muzzle end of a cannon tube 20 for rotation thereof when the cannon tube is rotatingly supported by a pair of roller pads 22 provided therefor on bed 14 and the breech end is axially supported by a spindle 23. When mounted on lathe 12, the axis of tube 20 is disposed parallel to the longitudinal axis of bed 14.

A carriage 24 is mounted on bed 14 for reciprocation on longitudinal ways 25 so as to travel parallel to the axis of tube 20. Carriage 24 is driven in a lead direction from the breech end of tube 20, which is from right to left in the drawings, by a lead screw 26 which is energized by power unit 16. A hydraulic cylinder 28 is mounted on carriage 24 so that the longitudinal axis is parallel to the longitudinal axis of bed 14. Cylinder 28 receives a piston 30 which is adjustably connected to bed 14 so that, when the piston is hydraulically energized, as hereinafter explained, carriage 24 is returned to the start position thereof on bed 14.

Figure 1:
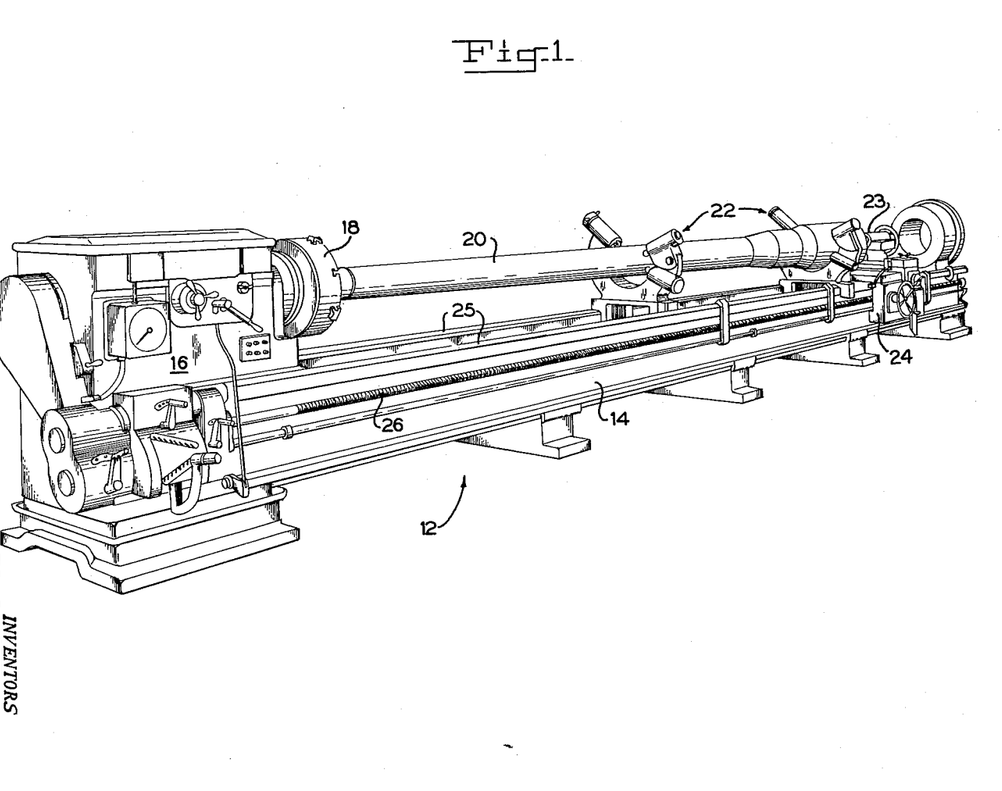
FIG. 1 is a perspective view of the lathe with a gun tube mounted thereto for turning.
Figure 2:
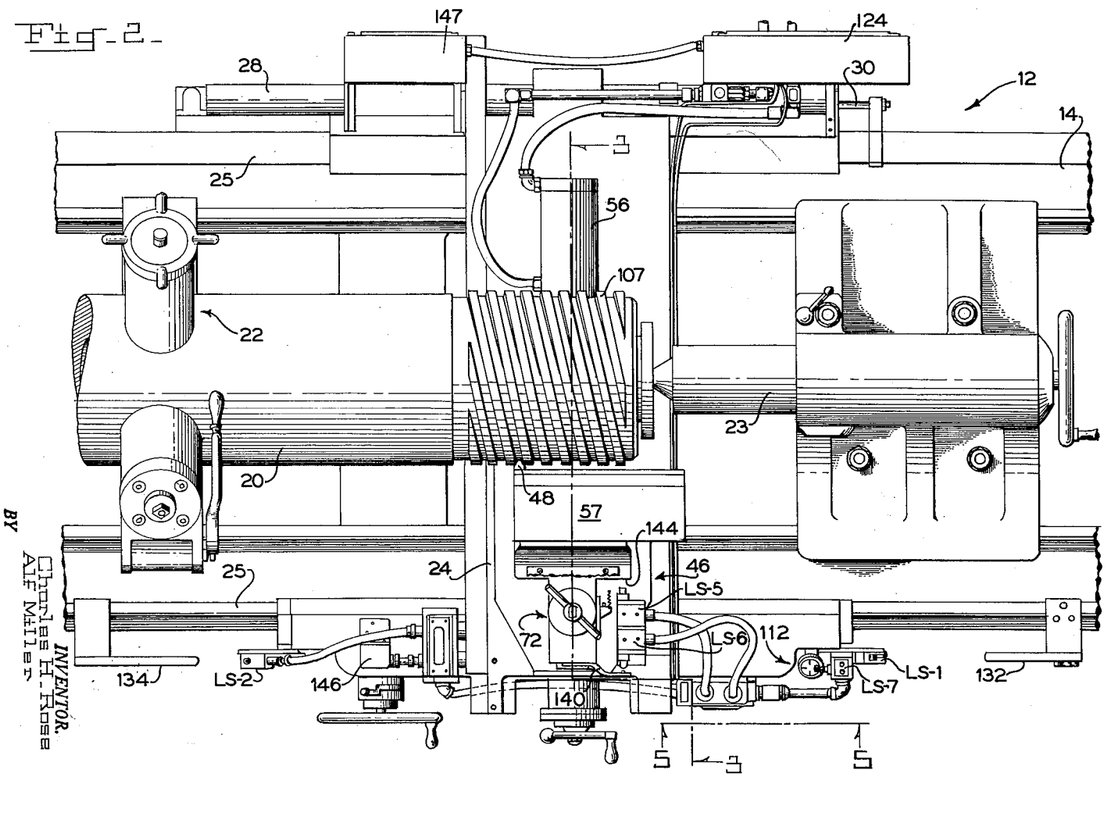
FIG. 2 is an enlarged top view of the portion of the lathe for cutting the threads on the gun tube.
Figure 3:
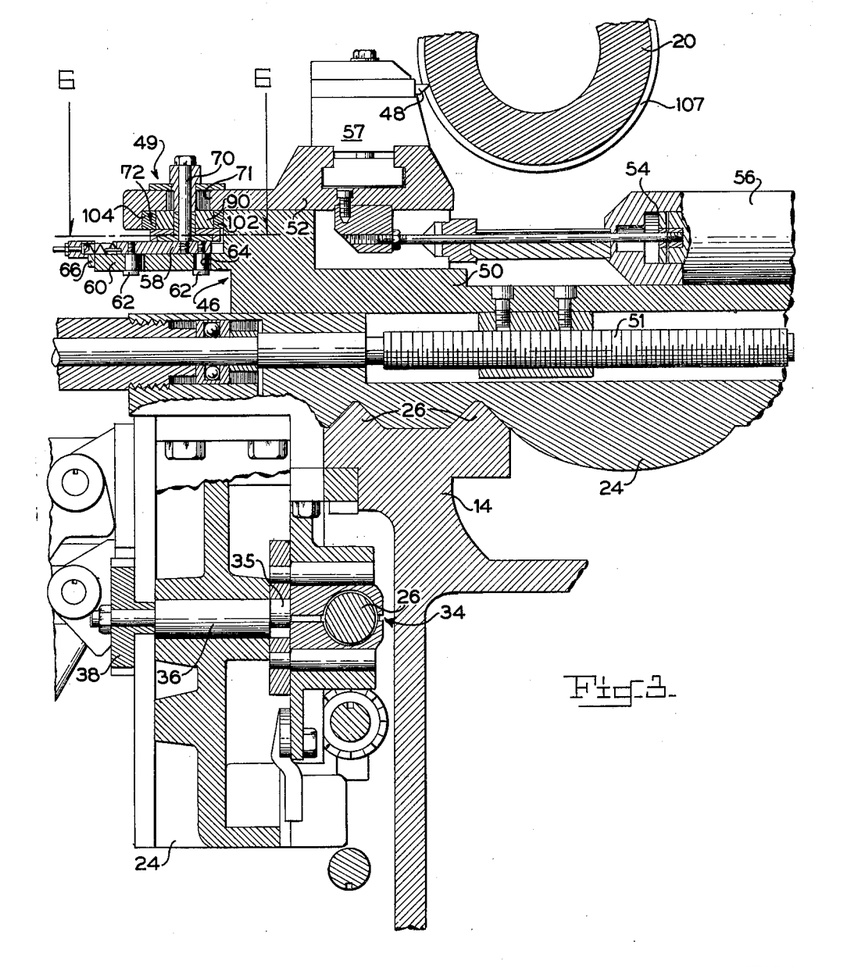
FIG. 3 is a view taken along line 3—3 of FIG. 2 and showing the half-nut device engaged with the lead screw.
Figure 4:
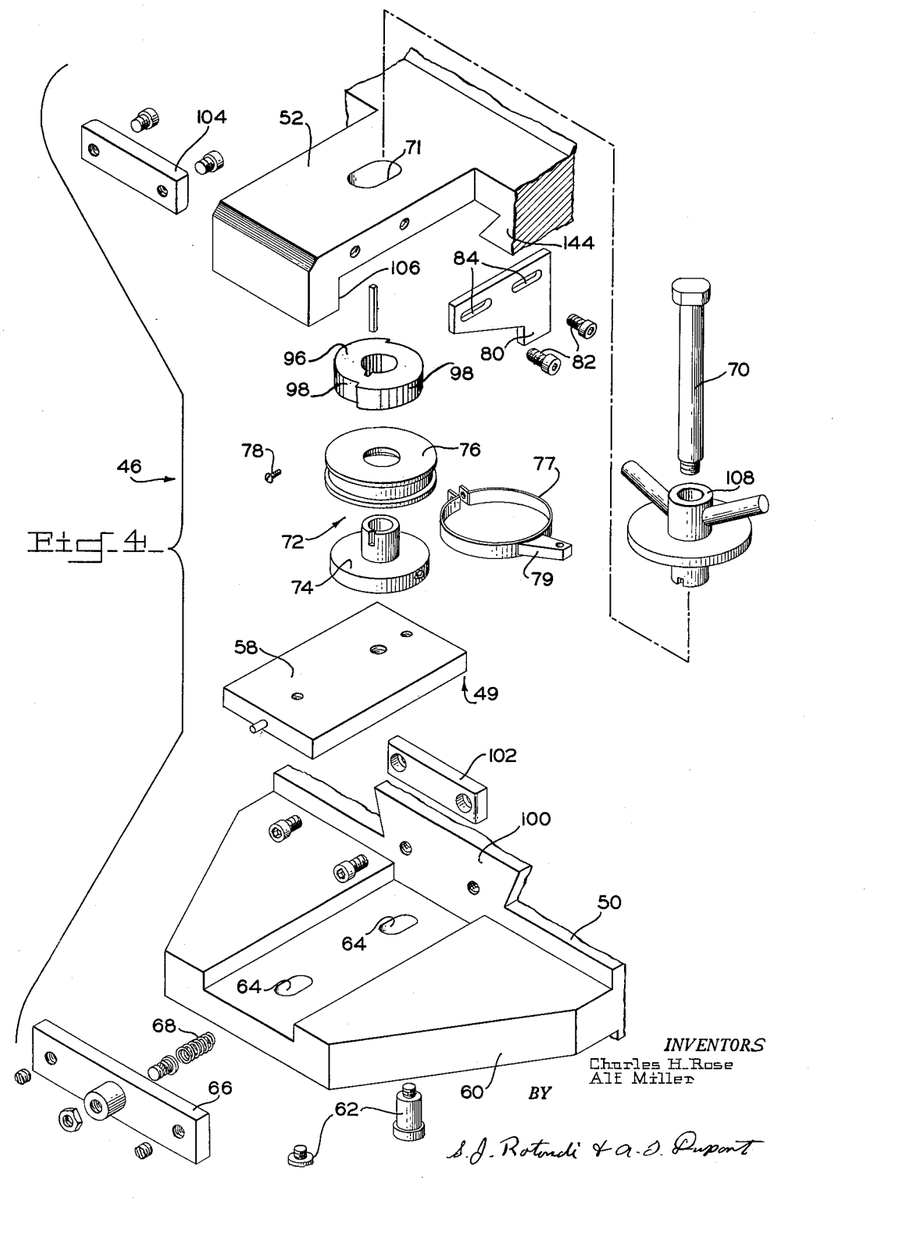
FIG. 4 is an exploded view of the tool block.
Figure 5:
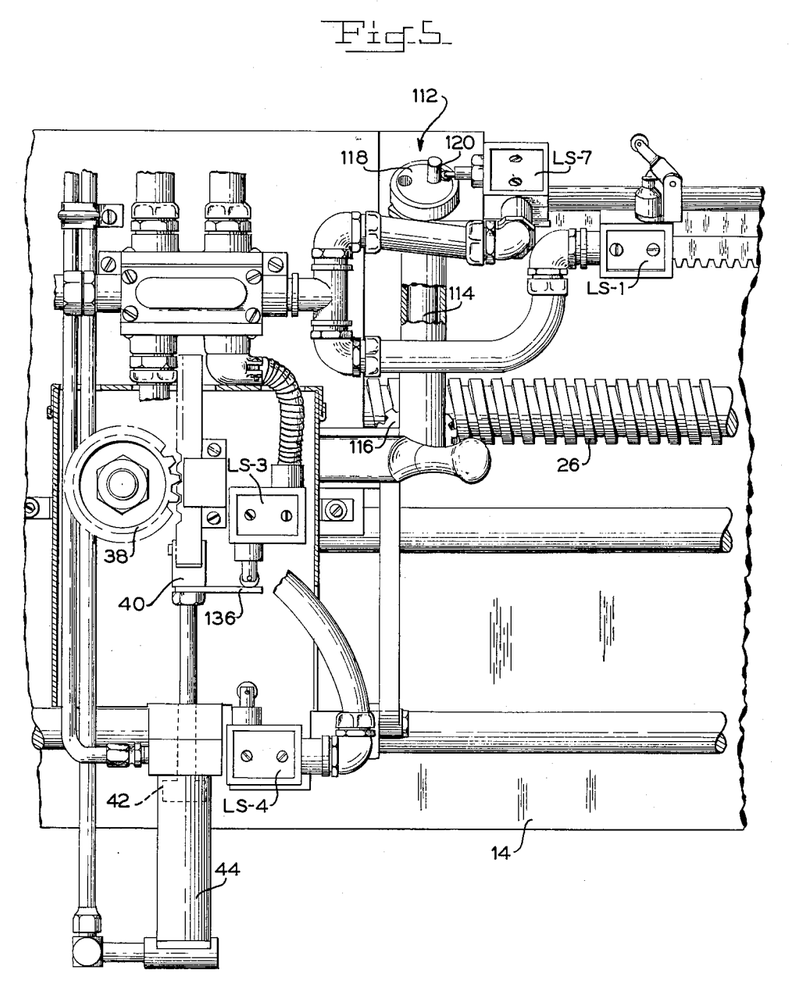
FIG. 5 is a view taken along line 5—5 of FIG. 2.

Carriage 24 is releasably connected to lead screw 26 by means of a half-nut device 34 (FIG. 3) which is of conventional design and which, when in a closed position, meshingly engages the carriage to the lead screw and, when in an open position, disconnects the carriage therefrom. Half-nut device 34 includes an actuating rotary cam 35 which is rotatably carried on an axle 36 extending transversely through the frame of carriage 24. A pinion gear 38 is mounted on the external end of axle 36 and is meshingly engaged by a rack 40 slidingly mounted on carriage 24 for vertical reciprocation. Rack 40 is actuated by a double-acting piston 42 which is connected thereto and which is received by a hydraulic cylinder 44 so as to be energizable, as hereinafter explained, for actuating half-nut device 34 between the open and closed positions thereof.

A tool block 46 is mounted on carriage 24 and such tool block includes a cutting tool 48 and a cam-clutch device 49 adapted for advancing the cutting tool towards the axis of tube 20 in predetermined and adjustable increments, as hereinafter described. Tool block 46 includes a base 50 which is mounted on carriage 24 by means of suitable ways so as to be laterally displaceable relative thereto and is adjustably positioned by means of a handle actuated screw 51. Slidingly mounted on base 50 is a carrier 52 which is disposed for lateral reciprocation between a retracted and a cutting position by a double-acting piston 54 which is received by a cooperating cylinder 56 for hydraulic actuation, as hereinafter described. Tool 48 is mounted on carrier 52 by means of a tool post 57 and the cutting position of said carrier is variable relative to cannon tube 20 as hereinafter explained.

Cam clutch device 49 includes a plate 58 which is slidingly disposed on a lateral shelf 60 provided on the outer end of base 50. Screws 62 extend upwardly through base 50 by means of elongated holes 64 and are threaded into plate 58. Holes 64 are elongated laterally, respective to the longitudinal axis of bed 14, whereby plate 58 has limited lateral displacement respective to base 50. A bracket 66 is bolted to the outer end of shelf 60 and such bracket supports a spring 68 which is disposed so as to act against the outer end of plate 58 for biasing the plate towards tube 20.

A post 70 extends vertically through carrier 52 by means of a slot 71 which is elongated to permit limited lateral displacement between the post and carrier and is fixed to plate 58 by means of a mating hole which threadingly receives the end of the post. Journaled on post 70 immediately above plate 58 is a sprag clutch 72 which includes a circular driven member 74 and a driving member 76. Driving member 76 is of cup configuration which is arranged to receive driven member 74 and the driving member is encircled by a divided collar 77 which is tightened thereagainst by a bolt 78. Collar 77 includes an arm 79 which extends radially outward therefrom for contact by a lug 80 on carrier 52 during displacement thereof from the cutting to the retracted position. The engagement between lug 80 and arm 79 rotates driving member 76 in a clockwise direction. Lug 80 is mounted on carrier 52 by means of a pair of screws 82 which thread into the carrier and which are received by elongated holes 84 through the lug, whereby the lug may be adjusted laterally respective to the carrier. Thus, the pitch which driving member 76 is angularly displaced during the displacement of carrier 52 from the cutting to the retracted position, may be regulated through the adjustable mounting of lug 80. A spring 85 is connected between arm 79 and base 50 for returning arm 79 and, therefore, driving member 76 to their normal positions when the arm is freed by the displacement of carrier 52 to the cutting position thereof.

Figure 6:
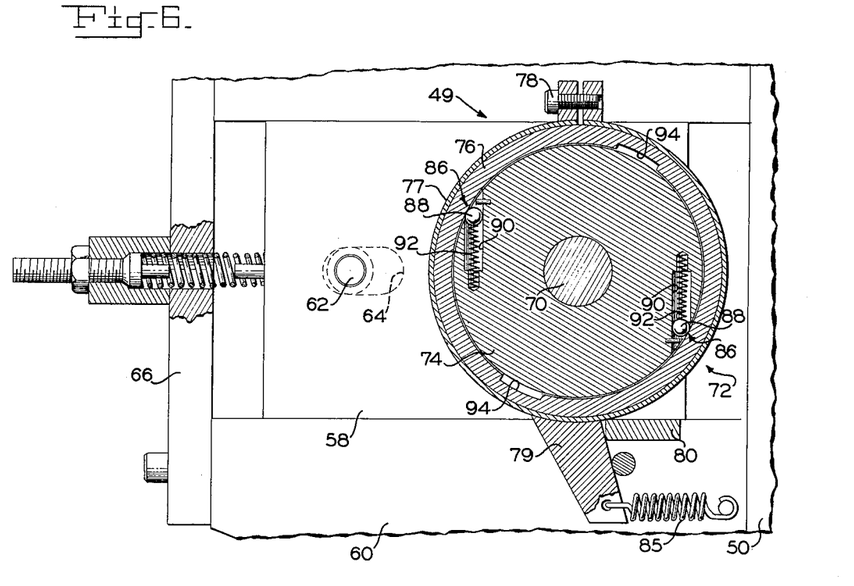
FIG. 6 is a view taken along line 6—6 of FIG. 3.
Figure 7:
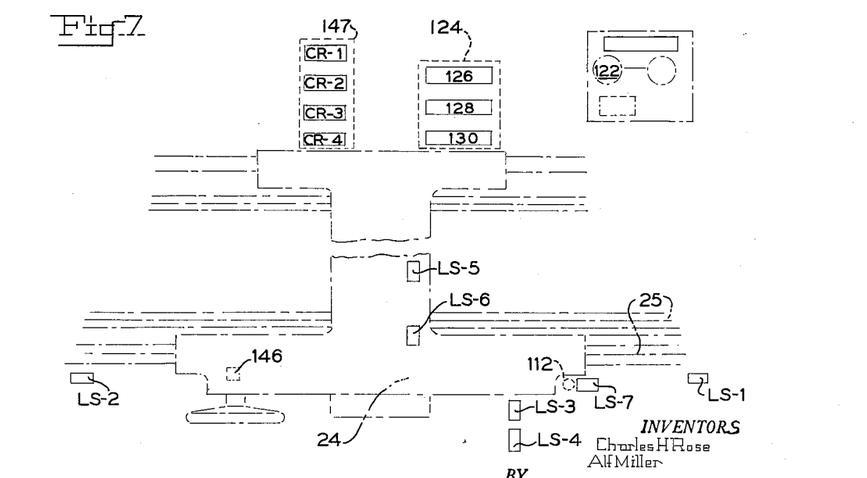
FIG. 7 is a diagrammatic view of the electrical system.

The angular displacement of driving member 76 is transferred unidirectionally to driven member 74 by a pair of sprag devices 86 which are oppositely disposed in driven member 74 so as to equalize the forces transferred thereto from driving member 76. Each of the sprag devices 86 includes a steel ball 88 which is slidingly received in a bore 90 extending chordally into driven member 74 from the periphery thereof. Bores 90 are so disposed that, when driving member 76 is rotated in a clockwise direction by the contact of arm 79 with lug 80 during actuation of carrier 52 from the cutting position, the balls 88 in the bores are jammed between the sides thereof and the inside of driving member 76, as best shown in FIG. 6, to transfer the angular clockwise displacement thereof to the driven member. The balls 88 are positioned to make instant engagement between driving member 76 and driven member 74 by a spring 92. Provided in the inside periphery of driving member 76 is a pair of recesses 94 which, when disposed adjacent the balls 88, increases the distance between the driving member 76 and driven member 74 so that the balls cannot make jamming engagement therebetween. Thus, by a predetermined disposition of the recesses 94, respective to the sprag means 86, the position of driven member 74, where the rotational displacement of driving member 76 cannot be transferred thereto, may be predeterminedly fixed.

Axially mounted on post 70 above sprag clutch 72 is a cam disc 96 which is keyed to driven member 74 for rotation therewith, whereby the angular displacement of the driven member is transferred directly to the cam disc. Cam disc 96 includes a pair of cam surfaces 98 which are identically generated around the periphery thereof for a predetermined radial progression so that the diametrical distance between similar points on the cam surfaces is always the same. The radial generation of the cam surfaces 98 determines the cutting position of carrier 52, as hereinafter explained, and the cam surfaces in cooperation with the adjusted position of lug 80 determines the distance which the cutting position of carrier 52 is advanced towards the axis of tube 20 during each reciprocation of the carrier.

Shelf 60 forms on base 50 a vertical wall 100 which faces away from the longitudinal axis of lathe 12. A hardened pad 102 is fixed to wall 100 so as to be contacted by one of the cam surfaces 98. Cam disc 96 is maintained in contact with pad 102 through the bias of spring 68. The opposite one of the cam surfaces 98 is contactable by a hardened pad 104 attached to a depending tail portion 106 of carrier 52. Consequently, the camming contact of one of the cam surfaces 98 with pad 102 translates the rotation of cam disc 96 to translational displacement of cam-clutch device 49, and, through the contact of the opposite one of the cam surfaces 98 by pad 104 when carrier 52 is advanced to the cutting position, varies the cutting position thereof according to the angular displacement of the cam disc. When carrier 52 is in the cutting position, it is held therein by the hydraulic force applied to piston 54 to engage cam disc 96 between pads 102 and 104. Therefore, the strain placed upon cam disc 90 during the cutting operation of tool 48 is taken by carrier 52 and base 50 rather than by post 70, which might be distorted if the strain is borne thereby, for a more accurate formation of threads 107 on tube 20. Hardened pads 102 and 104 are provided to prevent distortion of the contact areas of carrier 52 and base 50 with cam disc 96 by the impact between the contact areas when carrier 52 is actuated to cutting position by piston 54.

A handle 108 is keyed to driven member 74 so as to rotate cam disc 96 for positioning tool 48 for the initial pass of carriage 24. A suitably calibrated dial is mounted on handle 108 for indexing purposes.

It is important that half-nut device 34 be acuated to the closed position when the threads thereon and the threads of lead screw 26 are positioned for meshing engagement. Therefore, there is provided a timing device 112 for indicating the thread relationship. Timing device 112 includes a shaft 114 which is journaled to carriage 24 and which carries at one end a pinion gear 116 which has meshing engagement with lead screw 26. Thus, rotation of lead screw 26 is transferred to shaft 114 when carriage 24 is stationary respective to bed 14 but timing device 112 does not rotate when carriage is driven by the lead screw as the timing device advances according to the pitch thereof. A disc 118 is mounted on the opposite end of shaft 114 and a pin 120 extends therefrom adjacent the perimeter for rotary travel for a purpose to be explained hereinafter.

Figure 8:
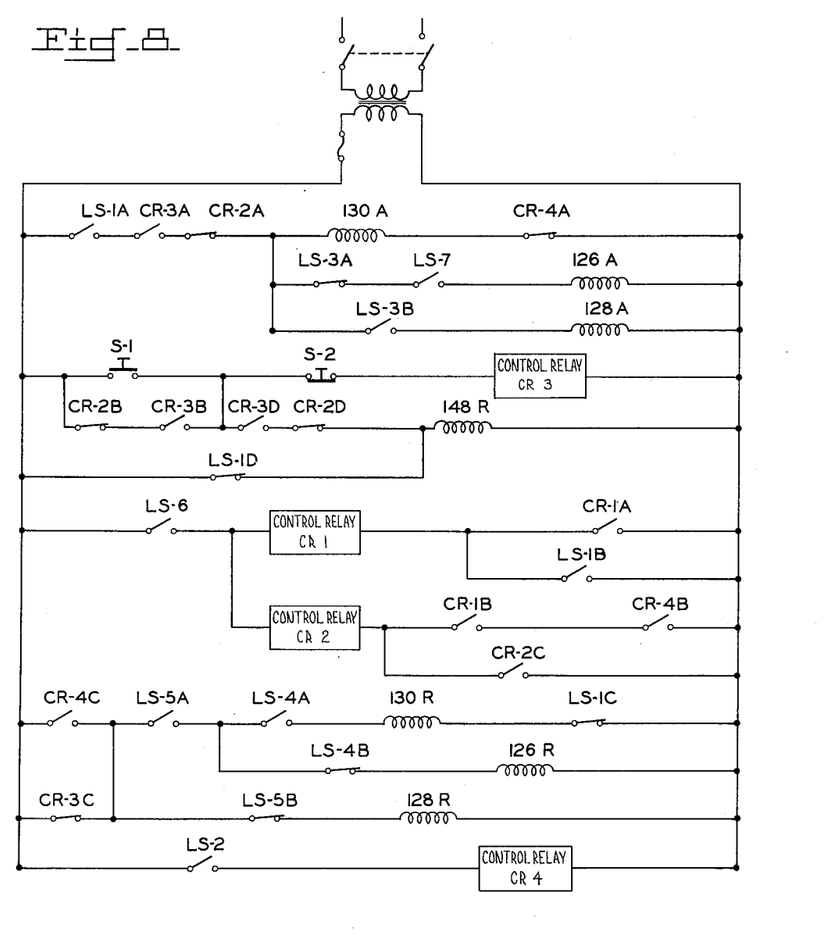
FIG. 8 is a schematic diagram of the electrical system.

Hydraulic pressure is transferred from a pump 122 to cylinders 28, 44, and 55 by suitable conduit means and the transfer to the cylinders is controlled by solenoid actuated valves located in a box 124 mounted on carriage 24. Pistons 30, 42, and 54 are double-acting and the transfer of the hydraulic fluid to and from the opposite ends of the cooperating cylinders 28, 44, and 56 is controlled by valves 130, 126, and 128, respectively. Valves 130, 126, and 128 are of conventional design and include a shuttle which is reciprocated to open one of two fluid outlets with an inlet port by a pair of electrical solenoids. In FIG. 8, the solenoid, which controls the flow of fluid into the side of the cooperating cylinder for driving the corresponding piston in a working direction is identified by the letter "A" while the solenoid which controls the flow of fluid to the side of the cylinder for actuating the piston to a retracted position is identified by the letter "R".

As piston 30 actuates carriage 24 in only one direction, from left to right as shown in the drawings, so as to return the carriage to its start position, hydraulic pressure is applied to only the left end of cylinder 28. The right end of cylinder 28 is connected to a buffer device (not shown) for cushioning the rapid return of carriage 24 to the start position.

Valves 126, 128 and 130 are controlled through their respective solenoids by an electrical system which includes a limit switch LS–1 mounted on carriage 24 so as to be contactable with a stop 132, which is mounted on bed 14 for longitudinal adjustment so as to contact such limit switch, when the carriage is in its start position. Another limit switch LS–2 is mounted on carriage 24 so as to be contactable with a stop 134, similarly mounted on bed 14, when the carriage reaches the end of its lead travel. A limit switch LS–3 and another limit switch LS–4 are mounted on carriage 24 adjacent rack 40 so as to be contactable respectively by a stop 136 on the rack when the rack is positioned for fully closing and opening half-nut device 34.

Limit switches LS–5 and LS–6 are mounted to base 50 so that limit switch LS–6 is contactable by a stop 140 adjustably mounted on carrier 52 when the carrier has been advanced towards the axis of tube 20 to where tool 48 is positioned for making the final pass to complete the formation of threads 107 to the predetermined depth. Limit switch LS–5 is contactable by a stop 144 mounted on carrier 52 when the carrier is in the retracted position thereof on base 50. Another limit switch LS–7 is mounted on carriage 24 adjacent timing device 112 so as to be contactable by pin 120 thereon when the threads of half-nut device 34 and lead screw 26 are positioned for meshing engagement. Also mounted on carriage 24 is a switch box 146 containing a start switch S–1 and a stop switch S–2.

The limit switches LS–1 through LS–7, with start switch S–1 and stop switch S–2, control the actuation of the valves 126, 128 and 130 through relays CR–1, CR–2, CR–3 and CR–4, which are housed in a switch box 147 mounted on carriage 24, and electrical circuits which electrically connect the switches, limit switches and valves as shown schematically in FIG. 8.

The automatic operation of lathe 12 so as to form threads 107 on the breech of tube 20 can best be understood by referring to the schematic diagram of the electrical system provided in FIG. 8. With power unit 16 energized to turn tube 20 and rotate lead screw 26, the operating cycle is initiated with carriage 24 in the start position thereof on bed 14 so that limit switch LS–1 is contacted by stop 132 to close contacts LS–1A and LS–1B and open contacts LS–1C and LS–1D of such limit switch. To start the cycle, start switch S–1 is pressed whereby relay CR–3 is energized so that contacts CR–3A, CR–3B and CR–3D thereof are closed and contact CR–3C is opened. The closing of contact CR–3A energizes solenoid 130A to actuate valve 130 so as to relieve the hydraulic pressure applied to cylinder 28 and permit the actuation of carriage 24 in the lead direction. With contacts CR–3B and CR–3D closed, a solenoid 148R is energized for opening a valve 148 which controls the hydraulic pressure output of pump 122.

Because carriage 24 is stationary on bed 14, timing device 112 is actuated by the rotating lead screw 26 to turn disc 118. When pin 120 on disc 118 makes contact with limit switch LS–7, which is the point where the threads of half-nut device 34 are in position for meshing engagement with the threads of lead screw 26, solenoid 126A is energized to actuate valve 126 for opening the hydraulic system to the end of cylinder 44 which will permit application of the hydraulic pressure from the pump to the side of piston 42 for driving rack 40 to actuate half-nut device 34 to the closed position. Whereby, carriage 24 is engaged with lead screw 26 so as to be driven thereby in a lead direction. When rack 40 reaches the end of its travel so that half-nut device 34 is in full engagement with lead screw 26, stop 136 contacts limit switch LS–3 to open contact LS–3A thereof and close contact LS–3B. With the opening of contact LS–3A, the electrical circuit to solenoid 126A is opened and the closing of contact LS–3B simultaneously energizes solenoid 128A which actuates valve 128 to move carrier 52 to the cutting position thereof. Thus, for all practical purposes, tool 48 starts immediately to cut into tube 20 for forming the threads 107 as carriage 24 begins to travel in a lead direction.

As carriage 24 leaves its start position, switch LS–1 becomes disengaged from stop 132, thereby opening contact LS–1A, to deenergize solenoids 128A and 130A, and closing contact LS–1B. Carriage 24 moves along bed 14 in a lead direction until switch LS–2 contacts stop 134 at the end of the carriage travel. The contact with stop 134 closes limit switch LS–2 to activate relay CR–4 whereby contact CR–4A thereof is opened and contacts CR–4B and CR–4C are closed. The closing of contact CR–4C energizes solenoid 128R which actuates valve 128 so as to direct hydraulic pressure to cylinder 56 and thereby energize piston 54 for retracting carrier 52 and so move tool 48 clear of tube 20. During the retraction of carrier 52, arm 79 on driving member 76 of cam clutch 49 is contacted by lug 80 to effect rotation of the driving member. The rotation of driving member 76 is transferred through sprag means 86 to driven member 74 which rotates cam disc 96 to position the cam surfaces 98 for advancing carrier 52 a further step towards the axis of tube 20 so that tool 48 will make a deeper cut thereinto during the succeeding cycle.

When carrier 52 is fully retracted, stop 140 contacts limit switch LS–5 to close contact LS–5A thereof and open contact LS–5B. The opening of contact LS–5B opens the circuit to solenoid 128R, which is consequently deenergized, and the closing of contact LS–5A energizes solenoid 126R which actuates valve 126 for opening the hydraulic system to cylinder 44 so as to drive rack 40 for actuating half-nut device 34 to the open position. Whereby, carriage 24 is disconnected from lead screw 26. When rack 40 reaches the end of its travel so that half-nut device 34 is in the open position, stop 136 contacts limit switch LS–4 to close contact LS–4A and open contact LS–4B. The opening of contact LS–4B opens the circuit to solenoid 126R and the closing of contact LS–4A energizes solenoid 130R to actuate valve 130 for introducing hydraulic pressure to cylinder 28 to return carriage 24 to the start position.

When carriage 24 reaches the start position thereof and ready for initiating another cycle, limit switch LS–1 contacts stop 132 to open contact LS–1C and close contacts LS–1A and LS–1B. With the opening of contact LS–1C, solenoid 130R is deenergized and the closing of contacts LS–1A and LS–1B triggers another cycle. The cycles are automatically repeated until tool 48 has cut threads 107 to the desired depth as indicated by the setting of stop 140 which, when cam disc 96 is rotated to advance tool 48 the final step prior to making the final pass along tube 20, contacts limit switch LS-6. The contact by stop 140 closes limit switch LS-6 to energize relay CR-1 through contact LS-1B which is closed, as hereinbefore explained. The activation of relay CR-1 closes contact CR-1A, to complete a holding circuit around that controlled by contact LS-1B, and also closes contact CR-1B. Limit switch LS-2 is closed by stop 132 when carriage 24 has completed its final pass and thereby relay CR-4 is activated to open contact CR-4A thereof and close contacts CR-4B and CR-4C. With the closing of contact CR-4B, relay CR-2 is activated to open contacts CR-2A, CR-2B and CR-2D and close contact CR-2C. The closing of contact CR-2C completes a holding circuit to maintatin relay CR-2 activated. The opening of contacts CR-2B and CR-2D opens the circuit to relay CR-3 which is released thereby so that contacts CR-3A, CR-3B and CR-3D thereof are opened and contact CR-3C is closed. The closing of contact CR-4C energizes solenoid 128R to actuate valve 128 for hydraulically energizing cylinder 56 to retract carrier 52. As carrier 52 moves away from its cutting position, limit switch LS-6 is opened, thereby releasing relays CR-1 and CR-2. When carrier 52 reaches its retracted position, limit switch LS-5 is contacted, as hereinbefore described, to trigger the opening of half-nut device 34 which in turn triggers the circuit for returning carriage 24 to its start position. When carriage 24 reaches its start position so that limit switch LS-1 contacts stop 132, contact LS-1A is closed, but the operating cycle will not recommence as contact CR-3A is open, and contact LS-1D is opened to open the circuit to solenoid 148R whereby valve 148 is actuated to close the hydraulic outlet from pump 122.

It is readily seen that the electrical system is so interlocked that sequence in the operating cycle will not commence until the preceding one is completed and all the parts of lathe 12 are in their correct positions.

It is also evident that, when an operator presses stop switch S-2, the holding circuit of relay CR-3, controlled by contacts CR-2B and CR-3B, is opened. Thereby, relay CR-3 is released to immediately stop and reverse the sequences of operations to actuate carrier 52 to the retracted position thereof and move carriage 24 back to the start position.

As has been explained hereinbefore, in order to insure that the operating cycle will not recommence when threads 107 are cut to the desired depth, the recesses 94 in driving member 76 are positioned so that when the driving member is returned to normal position by spring 85, after rotating cam disc 96 for positioning tool 48 for the final cut in tube 20, the recesses are disposed adjacent the balls 88. Thus, during the retraction of carriage 24 after the final pass and arm 79 is contacted by lug 80 for rotation of driving member 76, the rotation of the driving member cannot be transferred through the sprag means 86 to cam disc 96. Consequently, even if the electrical system should fail to stop the advancement of the tool position of carrier 52, cam-clutch 49 could not advance the cutting position even if the operating cycles were repeated.

From the foregoing it is clearly apparent that there is provided herein for a metal cutting lathe a hydraulic-electrical system with a cooperating cam-clutch device whereby threads may be formed quickly and accurately in a workpiece, such as a tube for a cannon, with interlocking features included to prevent accidental damage to the workpiece or lathe.

Moreover, through the advantages of this invention, the speed of the lathe operation may be increased considerably over that required for manual control of the operating sequences. This is because the point in the relationship between half-nut device 34 and lead screw 26, when meshing engagement is to be made, is critical. Therefore, in order for an operator to make the engagement manually through the conventional lever means connected to the half-nut device, the timing indicator must move comparatively slowly. In practical application of the invention it has been found that the speed of lathe 12 may be increased from 10 r.p.m., required for manual control, to 35 r.p.m., thus reducing the time required for forming threads 107 from approximately 5½ hours to 1½ hours. Moreover, threads 107 are formed with a far greater accuracy than is possible through manual control.

Although a particular embodiment of the invention has been described in detail herein, it is evident that may variations may be devised within the spirt and scope thereof and the following claims are intended to include such variations.

We claim:
1. In a metal cutting lathe having a bed, means for rotatingly mounting a workpiece parallel to the bed and a power unit for rotating the workpiece, the combination including: a carriage disposed for longitudinal reciprocation along the bed parallel to the main axis of the workpiece; a tool block carried by said carriage for manual lateral displacement and provided with a base; a carrier slidingly mounted on said base for lateral displacement between a retracted position and a variable cutting position, a tool carried by said carrier so as to cut into the workpiece when applied thereagainst by said carrier when in the cutting position, a lead screw rotated by the power unit; a half-nut device actuatable for selectively engaging said carriage to said lead screw for passing said carriage in a lead direction from a start position along the workpiece; means for actuating said half-nut device into and out of engagement with said lead screw including a pinion gear and a cooperating rack disposed for translational reciprocation on said carriage, a first hydraulically energized piston connected to said carriage to effect the return thereof counter to the lead direction to the start position; a second hydraulically energized piston connected to said carrier to effect actuation thereof between the retracted position and the cutting position and for pressing said tool against the workpiece when said carrier is in the cutting position so as to cut into the workpiece, a third hydraulically energized piston connected to said rack to effect actuation thereof for displacement of said half-nut device into and out of meshing engagement with said lead screw, solenoid actuated valves respectively disposed in cooperation with said first, second, and third pistons for controlling the application of hydraulic energy thereto, a timing device carried by said carriage and geared to said lead screw for rotation thereby, limit switches respectively arranged for actuation by said carriage, carrier, and rack at the opposite limits of displacement thereof and by said timing device when said lead screw and said half-nut device are related for meshing engagement, a cam-clutch device operationally interposed between said carrier and said tool block for advancing the cutting position of said carrier closer to the workpiece in predetermined increments of displacement by cyclic displacement of said carrier; cooperating means on said cam-clutch device and on said carrier for adjusting in a continuous range the increments of displacement of the cutting position of said carrier, an electric circuit electrically interconnecting said sloenoid actuated valves, said timing device and said limit switches for repeatingly and automatically actuating said carriage, carrier, and half-nut device in cyclic sequences to where said tool cuts into the workpiece a predetermined depth when the electric circuit is energized.

2. The combination as defined in claim 1 and including a stop switch, and means in said electrical circuit for sequentially energizing said third piston to actuate said carrier to the retracted position, energizing said second piston for actuating said rack to disengage said half-nut device from said lead screw and energizing said first piston for returning said carriage to the start position thereof when said stop switch is actuated.

3. The combination as defined in claim 1 wherein said cam-clutch device includes means for making said cam-clutch device ineffective relative to incrementally advancing the cutting position of said carrier responsive to cyclic reciprocation of said carrier when said tool has cut into the workpiece the predetermined distance.

4. The combination as defined in claim 1 wherein said cam-clutch device includes a cam disc arranged to contactually stop said carrier in the cutting position determined by said cam disc during displacement of said carrier toward the workpiece and means for converting cyclic reciprocation of said carriage to angular displacement of said cam disc for cyclically advancing the cutting position of said carrier toward the workpiece in the adjusted increment of displacement.

5. The combination as defined in claim 1 wherein said cam-clutch device includes a cam disc having a peripheral cam surface arranged to contactually stop said carrier in the cutting position during displacement of said carrier towards the workpiece, a sprag clutch arranged to convert cyclic reciprocation of said carrier to angular displacement of said cam disc for moving said cam surface relative to said carrier to progressively advance the cutting position thereof according to the adjusted increment of displacement responsive to cyclic reciprocation thereof, and means in said sprag clutch for making ineffective the cyclic reciprocation of said carrier respective to said cam disc when the cutting position of said carrier is advanced to where said tool cuts into the workpiece the predetermined distance.

6. The combination as defined in claim 1 wherein said tool block is provided with a vertical wall extending from said base and wherein said cam-clutch device includes a plate mounted on said base for limited lateral displacement, a post fixedly mounted on said plate so as to extend vertically upward therefrom through an elongated hole in said carrier to permit limited lateral movement relative thereto, a cam disc rotatingly mounted on said post, said cam disc being provided with a pair of similar cam surfaces formed around the periphery thereof and generated for similar radial progression so that diametrical distances between similar points on said cam surfaces are the same, means for biasing said plate towards the workpiece to press one of said cam surfaces against said wall of said tool block, a tail portion depending from said carrier for contact with the other one of said cam surfaces diametrically opposite where the other one of said cam surfaces contacts said wall to stop displacement of said carrier towards the workpiece at a cutting position whereby the excessive force applied by said second piston to said carrier is transferred directly through said cam disc to said wall, a spring mounted on said post for connection with said cam disc, and means cooperating with said sprag clutch for converting cyclic displacement of said carrier relative to said tool block to incremental angular displacement of said cam disc to progressively advance the cutting position of said carrier towards the workpiece by means of the generated progression of said cam surfaces.

7. The combination as defined in claim 6 wherein said sprag clutch includes a driving member, a driven member fixedly connected to said cam disc, ball means interposed between said driving and driven members for jamming interrelationship therewith so as to unidirectionally transfer rotation of said driving member to said driven member to progressively advance the cutting position of said carrier towards the workpiece as said driven member is sequentially rotated, and recesses formed in said driving member to freely relate said ball means with said driving member and said driven member when the cutting position of said carrier is advanced to where said tool has cut into the workpiece the predetermined distance.

8. The combination as defined in claim 7 wherein said cooperating means on said cam-clutch device and said carrier for adjusting the increments of displacement of the cutting position of said carrier includes an arm extending from said driving member, a lug mounted on said carrier for contact with said arm during cyclic displacement of said carrier for converting a portion of the translational travel of said carrier to angular displacement of said driving member, and means for adjustably mounting said lug on said carrier to vary the portion of the translational travel of said carrier which is converted to angular displacement of said driving member.

References Cited in the file of this patent
UNITED STATES PATENTS

| | | |
|---|---|---|
| 834,359 | Buckley | Oct. 30, 1906 |
| 1,426,552 | Cross | Aug. 22, 1922 |
| 2,854,822 | Lee | Oct. 7, 1958 |
| 2,903,933 | Mackenzie | Sept 15, 1959 |

FOREIGN PATENTS

| | | |
|---|---|---|
| 203,102 | Germany | July 30, 1907 |